(12) United States Patent　　(10) Patent No.: US 8,946,546 B2
Sykora et al.　　(45) Date of Patent: Feb. 3, 2015

(54) SURFACE TREATMENT OF NANOCRYSTAL QUANTUM DOTS AFTER FILM DEPOSITION

(71) Applicants: Milan Sykora, Los Alamos, NM (US); Alexey Koposov, Vancouver, WA (US); Nobuhiro Fuke, Los Alamos, NM (US)

(72) Inventors: Milan Sykora, Los Alamos, NM (US); Alexey Koposov, Vancouver, WA (US); Nobuhiro Fuke, Los Alamos, NM (US)

(73) Assignees: Los Alamos National Security, LLC, Los Alamos, NM (US); Sharp Corporation, Osaka (JP)

( * ) Notice: Subject to any disclaimer, the term of this patent is extended or adjusted under 35 U.S.C. 154(b) by 0 days.

(21) Appl. No.: 13/630,075

(22) Filed: Sep. 28, 2012

(65) Prior Publication Data

US 2014/0091278 A1　Apr. 3, 2014

(51) Int. Cl.
*H01L 31/042*　(2014.01)

(52) U.S. Cl.
USPC ............................. 136/255; 257/14; 438/785

(58) Field of Classification Search
CPC ........ B82Y 10/00; B82Y 20/00; B82Y 30/00; H01L 31/0232; H01L 51/426
USPC ............................. 257/14; 136/255; 438/785
See application file for complete search history.

(56) References Cited

U.S. PATENT DOCUMENTS

| 8,546,853 | B2 * | 10/2013 | Tian et al. ..................... 257/226 |
| 2006/0001119 | A1 * | 1/2006 | Liu et al. ....................... 257/442 |
| 2007/0221947 | A1 * | 9/2007 | Locascio et al. .............. 257/103 |
| 2009/0315016 | A1 * | 12/2009 | Elam et al. ..................... 257/15 |
| 2010/0167554 | A1 * | 7/2010 | Lee et al. ...................... 438/785 |
| 2012/0273719 | A1 * | 11/2012 | Tangirala et al. ......... 252/182.33 |
| 2013/0019930 | A1 * | 1/2013 | Semonin et al. .............. 136/255 |
| 2013/0263918 | A1 * | 10/2013 | Konstantatos et al. ....... 136/252 |

OTHER PUBLICATIONS

Zarghami et al, "p-Type PbSe and PbS Quantum Dot Solids Prepared with Short-Chain Acids and Diacids", ACSNano, Apr. 1, 2010, 4(4), 2475-2485.

* cited by examiner

*Primary Examiner* — David Vu
*Assistant Examiner* — Brandon Fox
(74) *Attorney, Agent, or Firm* — Baker & Hostetler LLP

(57) ABSTRACT

Provided are methods of surface treatment of nanocrystal quantum dots after film deposition so as to exchange the native ligands of the quantum dots for exchange ligands that result in improvement in charge extraction from the nanocrystals.

18 Claims, 5 Drawing Sheets

SURFACE TREATMENT OF NANOCRYSTAL QUANTUM DOTS AFTER FILM DEPOSITION

STATEMENT REGARDING FEDERAL RIGHTS

This invention was made with government support under Contract No. DE-AC52-06NA25396 awarded by the U.S. Department of Energy and made under CRADA number LA08C10583 with the SHARP Corporation. The government has certain rights in the invention.

TECHNICAL FIELD

The present disclosure relates to the fields of quantum dots and to the field of photoelectonic devices.

BACKGROUND

Colloidal semiconductor nanocrystals are typically comprised of a semiconducting core and the ligand shell, passivating the surface. The effective size of such assembly is dictated by the size of the core and the length of the ligand. As deposited on the substrate, the length of the ligands will determine the space occupied by the quantum dot.

The length of the ligands, however, diminishes the efficiency of charge extraction from the nanocrystal. Accordingly, there is a need in the art for quantum dot devices that exhibit improved charge extraction.

SUMMARY

As explained herein, surface treatment of nanocrystal quantum dots after the deposition on the film may be performed using exchange ligands that are (in some embodiments) smaller than native ligands on the quantum dots or otherwise different from the native ligands. The exchange ligands need not necessarily be smaller than the native or original ligands on the quantum dots, as the exchange ligands may differ structurally from the native ligands and may, in some embodiments, even be larger than the native ligands. Ligand exchange may result in a decrease of the nanocrystal's effective size, in turn leading to improvement of nanocrystal and/or charge infiltration into electrolyte and/or charge extraction materials; an improvement of the number of nanocrystals adsorbed on the film; an improvement of the charge extraction from the nanocrystals, and other enhanced characteristics.

In one embodiment, the present disclosure provides methods of constructing a device, comprising: contacting a population of quantum dots with an exchange composition that comprises at least one exchange ligand, the population of quantum dots surmounting a substrate, the population of quantum dots comprising at least one first ligand bound to a surface of a quantum dot, the contacting being performed under such conditions that the at least one first ligand is exchanged with the at least one exchange ligand. The exchange ligand is suitably bound to the surface of the quantum dot.

The present disclosure also provides photoelectronic devices, comprising a substrate; a population of quantum dots bearing exchange ligands and surmounting the substrate, at least some of the population of quantum dots having been contacted with a composition (suitably a composition that includes exchange ligands) under such conditions so as to effect a reduction in the number of first ligands bound to the surface of the quantum dots and an increase in the number of exchange ligands bound to the surface of the quantum dots.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 5 illustrates charge transfer in an exemplary device between a QD and other device components, such as an electrolyte, hole transport material, organic and inorganic semiconductor material, and the like.

DETAILED DESCRIPTION OF ILLUSTRATIVE EMBODIMENTS

Figure 1:
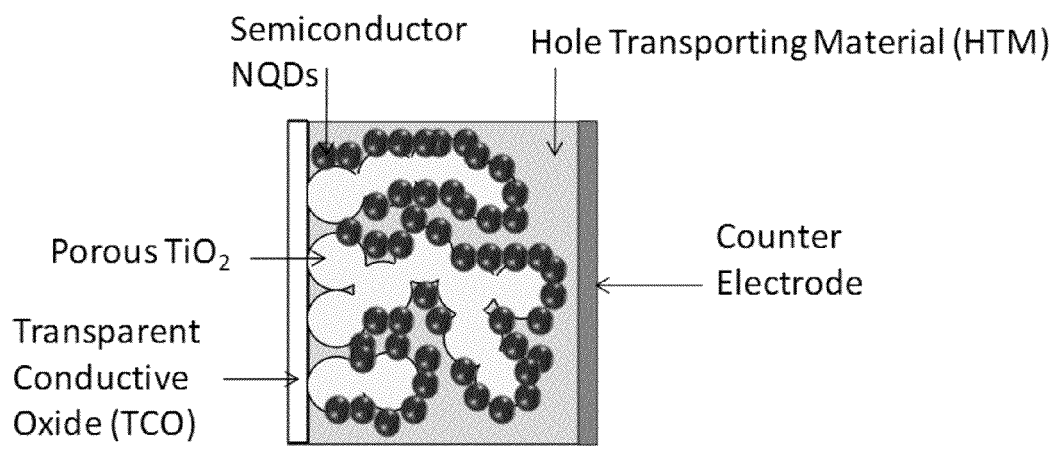
FIG. 1 illustrates an exemplary sensitized quantum dot cell.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range. Any and all documents cited in this application are incorporated herein by reference in their entireties.

In a first embodiment, the present disclosure provides methods of constructing devices. These methods include contacting a population of quantum dots with an exchange composition that comprises at least one exchange ligand, the population of quantum dots surmounting a substrate, the population of quantum dots comprising at least one first ligand bound to a surface of a quantum dot, and the contacting being performed under such conditions that the at least one first ligand is exchanged with the at least one exchange ligand. Ligands are rapidly exchanged. In some cases with porous films, the exchange rate is affected by diffusion of the new ligands into the pores. In some embodiments, the exchange is an equilibrium-driven process. Ligand exchange may be performed without any additional process conditions, although a user may apply heat or adjust the pH of a reaction to modulate exchange. The effect of the ligand substitution has been demonstrated in the solution or planar film using FTIR spectroscopy and well documented in literature. The ligand exchange may be spontaneous at room temperature.

Substrates suitable for the disclosed methods include metal oxides. Suitable metal oxides include, e.g., titanium oxide ($TiO_2$), tin oxide ($SnO_2$), zinc oxide (ZnO), tungsten oxide ($WO_3$), niobium oxide ($Nb_2O_5$), tantalum oxide ($Ta_2O_5$), barium titanate oxide ($BaTiO_3$), strontium titanate oxide ($SrTiO_3$), zinc titanate oxide ($ZnTiO_3$) and copper titanate oxide ($CuTiO_3$), and the like. $TiO_2$ is considered an especially suitable substrate material.

The substrate (e.g., metal oxide) may be a nanocrystalline film having pore sizes that are larger than the effective radius (i.e., the size of the QD added to the ligand size) of the quantum dots of the devices. QDs may have a characteristic dimension (e.g., radius, diameter, or other thickness) in the range of from about 0.1 nm to about 100 nm, from 1 nm to about 50 nm, from about 2 nm to about 10 nm, and all intermediate values. The pores of a substrate's material (illustrated in FIG. 1) are suitably larger than the characteristic dimension of the QDs. A substrate pore may (in some embodiments) be larger than the effective size of a quantum dot (with ligands) by 0.5 nm, 1 nm, 5 nm, 10 nm, 20 nm, 50 nm, or even 100 nm.

A variety of exchange compositions may be used in the disclosed methods. Aqueous compositions are considered especially suitable. An exchange composition may contain from about 0.01 vol % water up to about 100 vol % water, and all intermediate values. An exchange composition may have a pH in the range of from about 1 to about 14, or from about 1.5 to about 12.5, or from about 3 to about 11, or from about 5 to about 8, or even from about 6 to about 7.

The exchange composition may include an acid. Carboxylic acids, dicarboxylic acids, phosphonic acids, are all considered suitable. Haloacids (e.g., HCl, HBr, HI) are also considered suitable acids. Nitrogen-, sulfur-, phosphorous-containing, and boron-containing acids and their organic derivatives are all considered suitable for use as exchange compositions.

Exchange compositions that include a salt (e.g. NaCl dissolved in water or other solvent) are also considered suitable Examples include, but are not limited to sodium carboxylate, potassium carboxylate, calcium carboxylate, sodium dicarboxylate, potassium dicarboxylate, sodium phosphonate, potassium phosphonate, and the like. Salts may include: cations—depending on the solvents, such as for use in water—any inorganic cation. For use in organic solvents, alkyl ammonium is considered suitable. Anions may be selected based on their size. Anions may include inorganic anions, such as halogenides, chalcogenides, sulfates and sulfites, phosphates, nitrates, and the like, as well as organic-based anions, such as anions of carboxylic acid, organophosphonic acid, organophosphinic acid, and the like. Exchange compositions that include a neutral molecules containing functional groups, such as thiol, amine, pyridine, phosphine oxide, and the like. Other suitable neutral molecules include ligands used for passivation of NQDs: amines, phosphines, phosphine oxides, nitriles, and the like. It should be understood from the foregoing that the exchange ligand may include an anion, but may also be a neutral molecule as well. In some embodiments, a positively charged molecule may act as an exchange ligand. It should be understood, however, that an exchange composition may also include one or more bases, such as NaOH, KOH, nitrogen-containing bases, and the like.

A quantum dot may comprise a variety of materials. Some such materials include MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, HgSe, HgTe, Al2O3, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, $SnO_2$, $Sb_2S_3$, $Sb_2Se_3$, $Sb_2Te_3$, SnS, SnSe, SnTe, PbO, $PbO_2$, PbS, PbSe, PbTe, AlN, AlP, AlAs, AlSb, GaN, GaP, GaAs, GaSb, InN, InP, InAs, InSb, BP, Si, Ge, and the like. Materials that include cadmium (e.g., of CdX formula) are also suitable.

Quantum dots may also include alloys, mixtures, and other blends of the foregoing. A quantum dot may have an essentially uniform composition throughout, but quantum dots may also be of a core/shell configuration. A quantum dot may—as described elsewhere herein—have a radius or even a diameter of about 50 nm or less, 20 nm or less, or even 10 nm or less.

A first (or native) ligand may include an aliphatic portion, an aromatic portion. First (native) ligands are described elsewhere herein in additional detail.

In some embodiments, the ratio of an effective cross-sectional dimension of the exchange ligand to an effective cross-sectional dimension of the first ligand is in the range of from about 1:1 to about 1:100, or even about 1:1000, or even 1:10,000. Accordingly, the exchange ligand may be slightly or even significantly shorter than a native ligand. It should be understood, however, that in some embodiments the exchange ligand has a greater cross-sectional dimension than does the native ligand being replaced. As explained, structural differences between native and exchange ligands other than size may result in improved performance by the ligand-exchanged devices.

The disclosed device may also include placing the substrate into electronic communication with a first electrode. The substrate may also be placed into electronic communication with a second electrode. This may be accomplished by an electrolyte, a hole transporting material, a current collector, or other conductive material. Suitable electrolytes are described elsewhere herein.

The present disclosure also provides photoelectronic devices. The devices suitably include a substrate; a population of quantum dots bearing exchange ligands and surmounting the substrate, at least some of the population of quantum dots having been contacted with a composition under such conditions so as to effect a reduction in the number of first ligands bound to the surface of the quantum dots and an increase in the number of exchange ligands bound to the surface of the quantum dots. As explained elsewhere herein, quantum dots (also referred to as QDs) that include native (or first) ligands may have at least some of those ligands exchanged with exchange ligands that suitably differ from the native ligands in terms of size, structure, or both. The ligand-exchanged QDs are suitable for use in the disclosed devices.

The substrate may be in electronic communication with a first electrode, as described elsewhere herein.

The devices are suitably configured so as to be capable of exposing the substrate to illumination. This may be accomplished by, e.g., configuring a window or other feature in the device that permits the passage of illumination to the quantum dots. Lenses, mirrors, prisms, fiber optics, and the like may all be used to direct or otherwise deliver illumination to the quantum dots or even to other parts of the device.

In some embodiments, at least some of the quantum dots are at least partially surmounted by anions and at least partially surmounted by exchange ligands. It is not necessary that the QDs be surmounted by anions, however, as neutral molecules and even positively-charged molecules may be used. It is not necessary that all native ligands on a given QD be exchanged with exchange ligands, as QDs having from about 0.00001% to about 100%, or from about 1% to about 90%, or from about 5% to about 75%, or even from about 10% to about 50% of their native ligands exchanged with exchange ligands are considered suitable. It should also be understood that a given QD may have two or more types of native ligands residing thereon, and a given QD may be exposed to one, two, or even more types of exchange ligands.

The disclosed devices suitably exhibit an improvement in efficiency of charge transfer from QD to a hole transporting material relative to a comparable device wherein essentially all of the quantum dots are surmounted essentially entirely by first ligands. Put another way, the disclosed devices—which include QDs having at least some exchange ligands disposed thereon—exhibit some improvement in charge transfer efficiency relative to a comparable device in which the QDs remain surmounted by only their native ligands.

Suitable ligands (e.g., anions, including carboxyl groups) are described elsewhere herein, and may in some embodiments include an aliphatic portion. The devices may include second, third, and additional electrodes as a user may require.

The devices may also, in some embodiments, include an electrolyte that places the substrate and the first electrode in electronic communication with one another. The electrolyte may also place a second electrode into electronic communication with the substrate, the first electrode, or both.

Electrolyte may include a variety of materials. Exemplary electrolytes include—but are not limited to—sulfides of an alkali metal such as lithium sulfide ($Li_2S$), sodium sulfide ($Na_2S$) potassium sulfide ($K_2S$), rubidium sulfide ($Rb_2S$), and cesium sulfide ($Cs_2S$), Cobalt complex with general formula $[CoL_xL'_yL''_z](CI)$ where L, L', and L" are polypyridine ligands, CI is a counterion, and an organic solvent such as acetonitrile, propionitrile, butyronitrile, propylenecarbonate or other organic solvent in which the complex is soluble. An exemplary first electrode may be a metal oxide film associated with QDs on a conductive substrate. A second electrode may be a platinum electrode.

A substrate may—as described elsewhere herein—be a metal oxide. Suitable quantum dots include, for example, MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, HgSe, HgTe, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, $SnO_2$, $Sb_2S_3$, $Sb_2Se_3$, $Sb_2Te_3$, SnS, SnSe, SnTe, PbO, PbO2, PbS, PbSe, PbTe, AlN, AlP, AlAs, AlSb, GaN, GaP, GaAs, GaSb, InN, InP, InAs, InSb, BP, Si, Ge, and the like.

A quantum dot may be a composite that includes at least one of the materials mentioned above, and may even possess a core-shell structure. The quantum dot may be an alloy or may include two or more regions of different materials.

Dye sensitized solar cells (DSSC) are a promising technology in the field of photovoltaics. With the appearance of the semiconductor nanocrystals (also referred to as nanocrystal quantum dots or NQDs), one may substitute the dye in the conventional DSSC with those new materials. A general scheme representing an exemplary NQD sensitized cell is shown in FIG. 1.

Figure 2:
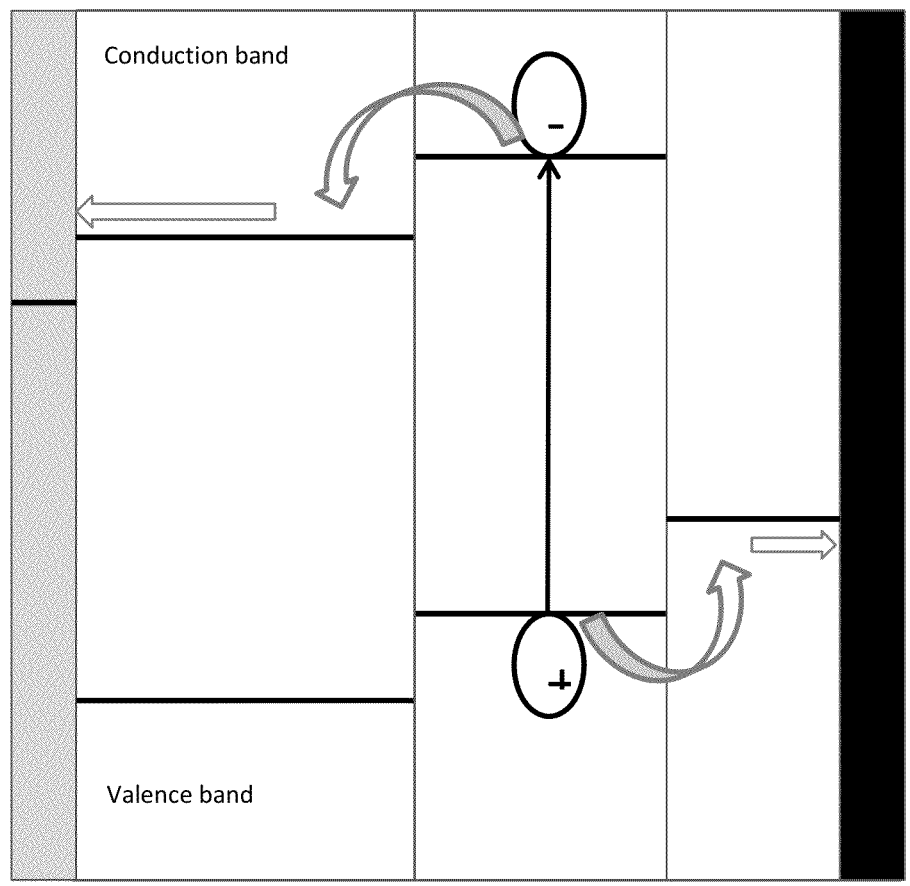
FIG. 2 illustrates charge flow in an exemplary sensitized quantum dot cell.

Exemplary cells may include a transparent conductive oxide (used on the side where light is hitting the cell; nanocrystalline (porous, in some embodiments) metal oxide (titanium dioxide, $TiO_2$, is frequently used), photosensitizer (NQD in our case), a hole transporting material that can be solid or could can be dissolved in electrolyte, and a counter electrode. The charge flow in such a cell is shown on FIG. 2. NQDs as synthesized are surrounded with the organic ligands (often long-carbon chain organic molecules) that protects the nanocrystals from aggregation. Upon sensitization of the metal oxide with NQDs, the linkers (organic molecules with double functionality) can be used to structure the devices. The substrate may have an area of 0.001 $cm^2$, 1 $cm^2$, 10 $cm^2$, 100 $cm^2$, 1000 $cm^2$, and above, depending on the user's needs.

Selection of a suitable HTM (hole transport/transfer material) is a consideration in construction of a cell. Hole extraction may be accomplished with cobalt (II) complexes, which may be dissolved in the acetonitrile (the selection of the solvent may be affected by the choice of HTM). Suitable hole transport materials include alkali metal such as lithium sulfide ($Li_2S$), sodium sulfide ($Na_2S$) potassium sulfide ($K_2S$), rubidium sulfide ($Rb_2S$), and cesium sulfide ($Cs_2S$), Cobalt complex with general formula $[CoL_xL'_yL''_z](CI)$ where L, L', and L" are polypyridine ligands, and CI is a counterion. Other suitable hole transport materials include Co complexes and poly sulfide redox couples; P type organic semiconductor (e.g. P3HT(Poly(3-hexylthiophene-2,5-diyl)): P-type inorganic semiconductor (e.g. CuSCN) and organic hole transport material (e.g. spiro-OMeTAD (2,20,7,70-tetrakis-(N,N-di-p-methoxyphenylamine)-9,90-spirobifluorene), and the like.

For evaluation of the efficiency of the charge extraction from the NQDs, photoluminescence experiments may be used. In particular, as made NQDs exhibit strong luminescence upon the photoexcitation; this property allows monitoring different charge transfer processes. Upon charge extraction (electron or hole) the photoluminescence is reduced. The extent of the photoluminescence suppression is related to the efficiency of the charge extraction. Therefore photoluminescence can be used to monitor efficiency of charge extraction from the quantum dots deposited on the porous films in the presence of the Co-based complexes. In the experiments, the NQD-sensitized $TiO_2$ film was immersed into the solution of the appropriate complex and the emission from the film was monitored. The decrease in photoluminescence over time was used to determine the charge extraction efficiency: the weaker photoluminescence was indicative of more efficient charge extraction. The decrease in photoluminescence upon time allows evaluating the charge extraction: the larger is the decrease in photoluminescence— the better the charge extraction.

When the film was exposed to a Co-complex containing electrolyte the typical decrease in the photoluminescence was about 50%. Without being bound to any single theory, this effect could be due to the fact that NQD as prepared are surrounded by the ligands (as explained above); those provide a protective layer which significantly inhibits the charge extraction from the NQD by the complex.

A factor that may affect the efficiency of quencher-QD interaction is surface passivation of the QD. Modification of the QD surface passivation layer may effect efficiency of the QD-electrolyte interaction. To investigate this possibility, the effect of PbS/MPTMS/$TiO_2$ film post-treatment with solution of acetic acid on the PL quenching efficiency was studied.

Figure 3:
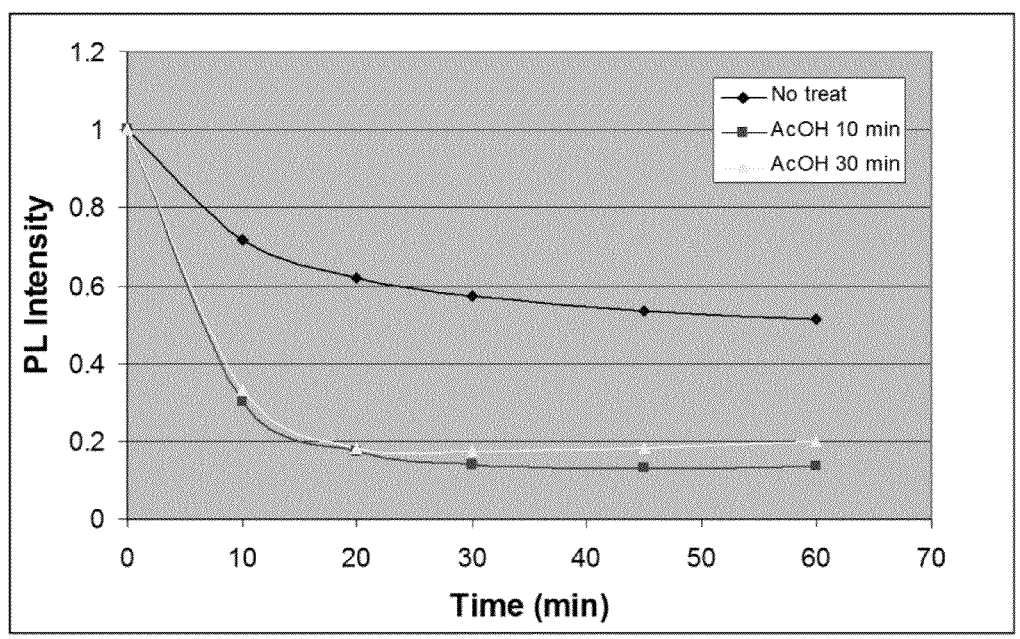
FIG. 3 illustrates the effect of post-treatment of the PbS/MPTMS/TiO$_2$ with acetic acid (soaked in the solution for 10 and 30 min) on the PL quenching efficiency in the presence of Co(bpy)$_3^{2+}$ complex (concentration appx. $10^{-2}$ M)

Post-treatment of the films can, in some embodiments, lead to partial or complete substitution of the oleic acid ligand (length~1 nm) with acetic acid (length<0.2 nm). Without being bound to any single theory, the reduction in the length of the surface ligand may improve access of the quencher to the QD surface and enhance the efficiency of the quenching process. The results of the experiments, summarized in FIG. 3, show enhancement in the PL quenching efficiency in the post-treated film.

Reduction of the ligand size may improve charge extraction efficiency. In the case of the presented exemplary experiment, the ligand present on the surface is oleate (anion of oleic acid) having a chain of 18 carbon atoms. Such long chains might hinder the HTM from approaching the substrate surface to a distance used to support charge extraction.

To investigate the effect of the ligand exchange, prepared films (NQD/linker/TiO$_2$) were immersed into a solution of acetic acid (see Zarghami et al., *ACS Nano* 2010, 4 (4), 2475-2485). After additional washing, to avoid the contamination of the system with unreacted acetic acid, the film was exposed to the Co-complex containing electrolyte under the similar conditions as were used for the untreated film. The results are shown in FIG. 3.

The results (FIG. 3) confirmed that the desired effect (reduced photoluminescence) was achieved following the exposure to the solution of the substitute ligands. Such treatment could be done after the assembly of the metal oxide/NQD electrode. In particular, by using the treatment the photoluminescence in the tested sample diminished almost by 90% compared to 50% for the untreated sample.

Acetic acid was chosen in the case presented in FIG. 3. The choice of exchange ligand is dictated by the surface properties of NQDs. In addition, variation of ligand functionality on the end removed from the anchoring group (e.g., carboxylic group) may influence the electrolyte penetration. For example, the choice of the polar group on the ligand may facilitate this process and, in the case of using a polar solvent in which a hole transporting materials are dissolved, make charge extraction more efficient.

One factor that may affect the efficiency of quencher-QD interaction is surface passivation of the QD. Modification of the QD surface passivation layer may affect efficiency of the QD-electrolyte interaction. To investigate this possibility, the effect of PbS/MPTMS/TiO2 film post-treatment with solution of acetic acid on photoluminescence quenching efficiency was studied. Post-treatment of the films can, in some embodiments, lead to partial or complete substitution of the oleic acid ligand (length~2 nm) with acetic acid (length<0.2 nm). Without being bound to any single theory, reduction in the length of the surface ligand may improve access of the quencher to the QD surface and enhance the efficiency of the quenching process. The results of the experiments, summarized in FIG. 3, show enhancement in the PL quenching efficiency in the post-treated film.

Without being bound to any particular theory, it is believed that in some embodiments, exchange of a native (or first or original) ligand for an exchange ligand that is smaller in some dimension (e.g., length) is responsible for the disclosed devices' improved performance. This is not necessarily the only explanation for the disclosed devices' improved performance, as replacement of a native (e.g., organic) ligand with an exchange ligand (e.g., an anion) of about the same size as the ligand may also result in a performance improvement. Thus, exchange ligands with about the same length as native ligands but having different structure may have an effect on the efficiency of charge extraction.

It should also be understood that the disclosed techniques are not necessarily limited to using exchange solutions that comprise an acid. In some embodiments, the native ligand may be exchanged by contact with a salt solution (e.g., tetrabutylammonium acetate). In another non-limiting example, if a QD film having oleate ligands on the QDs is immersed in a solution of the tetrabutylamonium bromide/chloride/iodide, the native ligands (oleate) are replaced with bromide/chloride/iodide. The foregoing is considered especially suitable for embodiments in which the QDs possess native charged ligands. In other embodiments when the native ligand is neutral (e.g., when the QD comprises CdSe, InP, CuInSe$_2$), the exchange ligand may be neutral as well. Thus, a user may replace charged native ligands with charged exchange ligands. A user may also replace neutral native ligands with neutral exchange ligands.

It should also be understood that the present disclosure is not limited to methods in which a quantum dot with a single type of native ligand has that native linker exchanged with a single type of exchange ligand. A user may exchange one or more types of native ligands with one, two, three, or even more types of exchange ligands.

Figure 4:
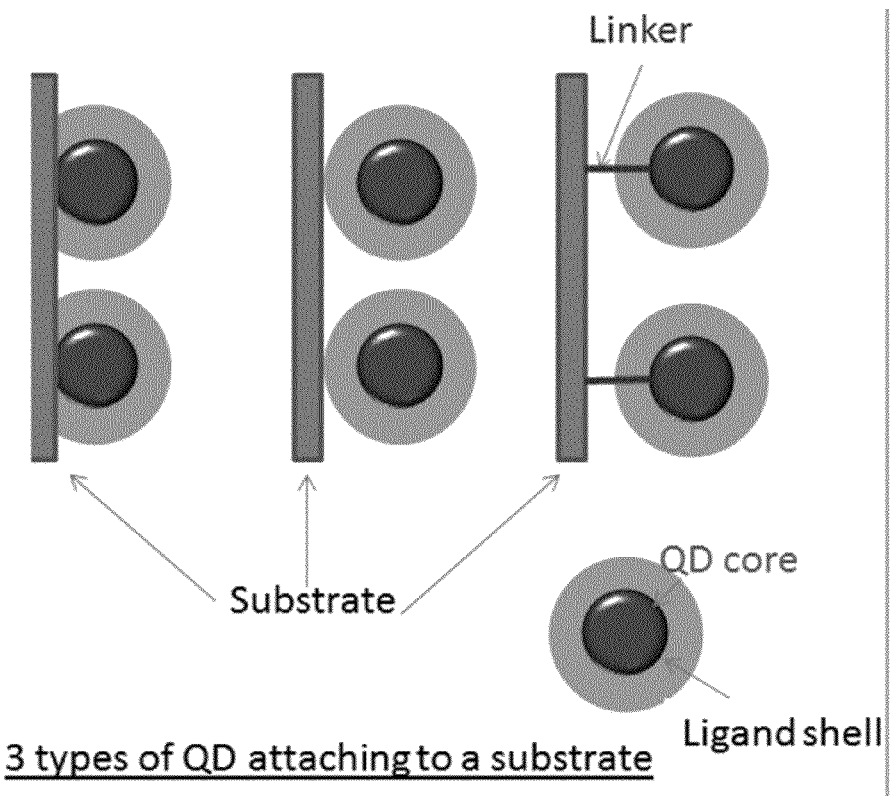
FIG. 4 illustrates three exemplary methods of associated a quantum dot (QD) with a substrate (showing first or native ligands replaced with shorter ligands after QD deposition on the substrate)
Figure 5:
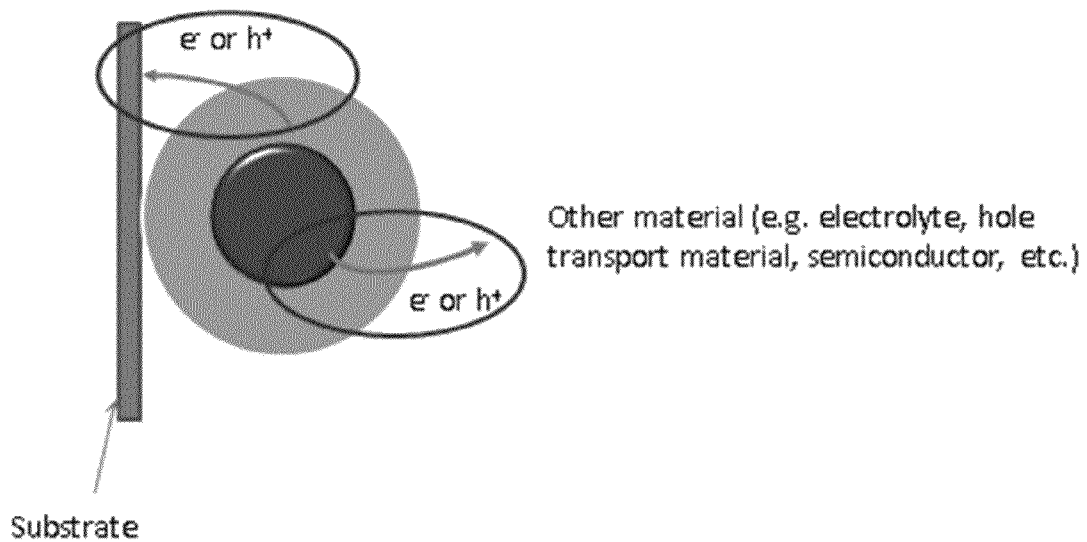

In some embodiments (e.g., FIG. 4), a device may include a linker that may promote or enhance association of a QD with the substrate. In general, a linker can be described as an organic molecule with general structure A-B-C. A may be a chemical group adapted for binding to a substrate (e.g., to a metal oxide, such as TiO$_2$), C is a chemical group adapted for binding to a QD, and B may be a divalent organic moiety. A ligand may be considered an organic molecule without the functional group A. In this case the organic fragment B' need not be divalent, but may instead have a single valency so as to couple with C. In some cases (such as adaptation for water solubility), a ligand may be bifunctional.

Examples of suitable chemical coupling groups A include, e.g., carboxylic acid (and derivatives), dicarboxylic acid, phosphonic acid, dihydroxyl, cyanocarboxylic acid, siloxane, boronic acid, and the like. Exemplary chemical coupling groups C include carboxylic acid, phosphonic acid, thiol, amine, pyridine, phosphine oxide, and the like.

For some linkers, suitable divalent organic linking groups B include aliphatic, aromatic, cycloaliphatic, and aromatic-cycloaliphatic, and also heteroatoms-containing aliphatic, aromatic, cycloaliphatic, and aromatic-cycloaliphatic, hydrocarbon radicals, such as substituted or unsubstituted, preferably unsubstituted, linear or branched, preferably linear, alkanediyl radicals having from 1 to 10, preferably from 1 to 3, and in particular 3 carbon atoms, which may also contain cyclic groups within the carbon chain.

Linking groups may also include substituted or unsubstituted, preferably unsubstituted, linear or branched, preferably linear, alkenediyl radicals having from 1 to 10, preferably from 1 to 3, and in particular 3 carbon atoms, which may also contain cyclic groups within the carbon chain. Other alternatives include alkynediyl radicals having from 1 to 10, preferably from 1 to 3, and in particular 3 carbon atoms, which may also contain cyclic groups within the carbon chain Still further options include substituted or unsubstituted, preferably unsubstituted, linear or branched, preferably linear, oxaalkanediyl radicals having from 2 to 10, preferably from 2 to 3, and in particular 2 carbon atoms, which within the carbon chain may also contain cyclic groups, (5) divalent polyester radicals containing repeating polyester units of the formula —(—CO—(CHR3)r-CH2-O—)—. In the foregoing formula, the index r is preferably from 1 to 2 and the substituent R3=hydrogen, or an alkyl, cycloalkyl or alkoxy radical. In some embodiments, no substituent contains more than 3 carbon atoms.

Further alternative options include phen-1,4-, -1,3- or -1,2-ylene, naphth-1,4-, -1,3-, -1,2-, -1,5- or -2,5-ylene, propane-2,2-di(phen-4'-yl), methane-di(phen-4'-yl), biphenyl-4,4'-diyl or 2,4- or 2,6-tolylene; or even cycloalkanediyl radicals having from 6 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4''-diyl, especially 3,3,5-trimethylcyclohexane-1,5-diyl or dicyclohexylmethane-4,4'-diyl. Aliphatic divalent organic linking groups are considered especially suitable, but are not critical or required.

For some exemplary ligands, the organic group B' may be aliphatic, aromatic, cycloaliphatic, and aromatic-cycloaliphatic, and also heteroatoms-containing aliphatic, aromatic, cycloaliphatic, and aromatic-cycloaliphatic, or hydrocarbon radicals. In some embodiments, one may use substituted or unsubstituted, preferably unsubstituted, linear or branched, preferably linear, alkanyl radicals having more than 3 carbon atoms, which may also contain cyclic groups within the carbon chain. One may also use substituted or unsubstituted, preferably unsubstituted, linear or branched, preferably linear, alkenyl radicals having more than 3 carbon atoms, which may also contain cyclic groups within the carbon chain. One may also employ alkynyl radicals having more than 3 carbon atoms, which may also contain cyclic groups within the carbon chain. One may also use substituted or unsubstituted, preferably unsubstituted, linear or branched, preferably linear, oxaalkanyl radicals having more than 3 carbon atoms, which within the carbon chain may also contain cyclic groups.

Other suitable alternative include phen-1,4-, -1,3- or -1,2-ylene, naphth-1,4-, -1,3-, -1,2-, -1,5- or -2,5-ylene, propane-2,2-di(phen-4'-yl), methane-di(phen-4'-yl), biphenyl-4,4'-diyl or 2,4- or 2,6-tolylene. One may also use cycloalkanyl radicals having from 6 to 20 carbon atoms, such as cyclobutanyl, cyclopentanyl, cyclohexanyl, cycloheptanyl, norbornanyl, adamantanyl, decalinyl, 3,3,5-trimethylcyclohexanyl, 1-methylcyclohexanyl, dicyclohexylmethanyl, 1,1'-dicyclohexanyl or 1,4-dicyclohexylhexanyl, especially 3,3,5-trimethylcyclohexanyl or dicyclohexylmethanyl. Aliphatic organic linking groups are considered especially suitable, but are not required or critical.

What is claimed:

1. A method of constructing a device, comprising:
   contacting a population of quantum dots with an exchange composition that comprises at least one exchange ligand,
   the population of quantum dots surmounting a porous substrate,
   the population of quantum dots comprising at least one first ligand bound to a surface of a quantum dot,
   the contacting being performed under such conditions that the at least one first ligand is exchanged with the at least one exchange ligand,
   placing the substrate into electronic communication with a first electrode,
   configuring the device so as to be capable of exposing the substrate to illumination, and
   introducing an electrolyte, a hole transfer material, or both, so as to place the substrate and the first electrode in electronic communication with one another.

2. The method of claim 1, wherein the substrate comprises a metal oxide.

3. The method of claim 1, wherein the exchange composition comprises an acid.

4. The method of claim 1, wherein the exchange composition comprises a salt.

5. The method of claim 1, wherein a quantum dot comprises MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, HgSe, HgTe, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, $SnO_2$, $Sb_2S_3$, $Sb_2Se_3$, $Sb_2Te_3$, SnS, SnSe, SnTe, PbO, $PbO_2$, PbS, PbSe, PbTe, AlN, AlP, AlAs, AlSb, GaN, GaP, GaAs, GaSb, InN, InP, InAs, InSb, BP, Si, or any combination thereof.

6. The method of claim 1, further comprising placing the substrate into electronic communication with a second electrode.

7. A photoelectronic device, comprising:
   a porous substrate;
   a population of quantum dots bearing exchange ligands and surmounting the substrate,
   at least some of the population of quantum dots having been contacted with a composition under such conditions so as to effect a reduction in the number of first ligands bound to the surface of the quantum dots and an increase in the number of exchange ligands bound to the surface of the quantum dots,
   the substrate being in electronic communication with a first electrode, and
   the device being configured so as to be capable of exposing the substrate to illumination; and
   an electrolyte, a hole transfer material, or both, that places the substrate and the first electrode in electronic communication with one another.

8. The device of claim 7, wherein at least some of the quantum dots are at least partially surmounted by first ligands and at least partially surmounted by exchange ligands.

9. The device of claim 7, wherein the device exhibits an improvement in efficiency of charge transfer from quantum dot to hole transporting material relative to a comparable device wherein essentially all of the quantum dots are surmounted essentially entirely by first ligands.

10. The device of claim 7, wherein an exchange ligand comprises a carboxyl group.

11. The device of claim 7, wherein a first ligand comprises an aliphatic portion.

12. The device of claim 7, further comprising a second electrode.

13. The device of claim 7, further comprising an electrolyte, a hole transfer material, or both, that places the substrate and the first electrode in electronic communication with one another.

14. The device of claim 7, wherein the substrate comprises a metal oxide.

15. The device of claim 7, wherein a structure of the substrate comprise a nanocrystalline film.

16. The device of claim 7, wherein the population of quantum dots comprises MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, HgSe, HgTe, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, $SnO_2$, $Sb_2S_3$, $Sb_2Se_3$, $Sb_2Te_3$, SnS, SnSe, SnTe, PbO, $PbO_2$, PbS, PbSe, PbTe, AlN, AlP, AlAs, AlSb, GaN, GaP, GaAs, GaSb, InN, InP, InAs, InSb, BP, Si, or any combination thereof.

17. A method of constructing a device, comprising:
contacting a population of quantum dots with an exchange composition that comprises an acid and at least one exchange ligand,
the population of quantum dots surmounting a porous substrate,
the population of quantum dots comprising at least one first ligand bound to a surface of a quantum dot,
the contacting being performed under such conditions that the at least one first ligand is exchanged with the at least one exchange ligand,
placing the porous substrate into electronic communication with a first electrode,
configuring the device so as to be capable of exposing the porous substrate to illumination; and
introducing an electrolyte, a hole transfer material, or both, so as to place the porous substrate and the first electrode in electronic communication with one another.

18. A method of constructing a device, comprising:
contacting a population of quantum dots with an exchange composition that comprises at least one exchange ligand,
the population of quantum dots surmounting a porous substrate,
the population of quantum dots comprising at least one first ligand bound to a surface of a quantum dot,
the quantum dot comprising CdO, CdS, CdSe, CdTe, HgO, HgS, HgSe, HgTe, $Al_2Se_3$, $Ga_2Se_3$, $In_2Se_3$, $Sb_2S_3$, $Sb_2Se_3$, $Sb_2Te_3$, SnSe, SnTe, PbO, $PbO_2$, PbS, PbSe, PbTe, AlSb, GaAs, GaSb, or any combination thereof,
the contacting being performed under such conditions that the at least one first ligand is exchanged with the at least one exchange ligand;
placing the porous substrate into electronic communication with a first electrode;
configuring the device so as to be capable of exposing the porous substrate to illumination; and
introducing an electrolyte, a hole transfer material, or both, so as to place the porous substrate and the first electrode in electronic communication with one another.

\* \* \* \* \*